United States Patent
Cudzilo (10) Patent No.: US 8,282,005 B2
(45) Date of Patent: Oct. 9, 2012

(54) PORTABLE DATA TERMINAL WITH INTEGRATED FLASHLIGHT

(75) Inventor: Dennis Henry Cudzilo, Camillus, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 3 days.

(21) Appl. No.: 12/818,280

(22) Filed: Jun. 18, 2010

(65) Prior Publication Data
US 2011/0309151 A1    Dec. 22, 2011

(51) Int. Cl.
*G06K 7/10* (2006.01)
(52) U.S. Cl. .................. 235/470; 235/467.45
(58) Field of Classification Search .......... 235/470, 235/435, 467.45
See application file for complete search history.

(56) References Cited

U.S. PATENT DOCUMENTS

| | | |
|---|---|---|
| 5,701,001 A | 12/1997 | Sugifune et al. |
| 6,034,379 A | 3/2000 | Bunte et al. |
| 6,340,114 B1 | 1/2002 | Correa et al. |
| 6,808,114 B1 | 10/2004 | Palestini et al. |
| 6,832,729 B1 | 12/2004 | Perry et al. |
| 2006/0043191 A1* | 3/2006 | Patel et al. ............... 235/462.21 |
| 2007/0080229 A1* | 4/2007 | Longacre et al. ........ 235/462.45 |
| 2007/0131770 A1 | 6/2007 | Nunnink |
| 2007/0170259 A1 | 7/2007 | Nunnink et al. |
| 2007/0228175 A1* | 10/2007 | Kotlarsky et al. ........ 235/462.45 |

FOREIGN PATENT DOCUMENTS
EP    1387560 A2 *    2/2004

OTHER PUBLICATIONS

European Search Report from corresponding patent application No. 11169155.6.

* cited by examiner

*Primary Examiner* — Thien M. Le
*Assistant Examiner* — Sonji Johnson
(74) *Attorney, Agent, or Firm* — Hiscock & Barclay, LLP (57) ABSTRACT

A mobile device comprising: an indicia reader for reading information bearing indicia; a communication module for sending and receiving radio communications; a display for displaying information; a processor for controlling software and firmware operation; a keypad for entering data to the processor; an illuminator for providing an operator with illumination under low ambient lighting conditions; and, a housing supporting the communication system, display, image processor and keypad configured to facilitate an operator holding the mobile device in one hand and keypad data entry with the other hand.

18 Claims, 6 Drawing Sheets

PORTABLE DATA TERMINAL WITH INTEGRATED FLASHLIGHT

FIELD OF THE INVENTION

The present invention relates to indicia reading devices, and more particularly to a mobile device having an integral flashlight.

BACKGROUND

Indicia reading devices (also referred to as scanners, image reader, indicia readers, etc.) typically read data represented by printed or displayed information bearing indicia (IBI), (also referred to as symbols, symbology, bar codes, etc.) For instance one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by a processor which performs signal and/or image processing to extract the data represented by the symbol. Optical indicia reading devices typically utilize visible or infrared light. Laser indicia reading devices typically utilize transmitted laser light.

One-dimensional (1D) optical bar code readers are characterized by reading data that is encoded along a single axis, in the widths of bars and spaces, so that such symbols may be read from a single scan along that axis, provided that the symbol is sampled with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, some or all of which must be scanned and decoded, then linked together to form a complete message. Scanning still requires relatively higher resolution in one dimension only, but multiple linear scans at different locations on a second dimension are needed to read the whole symbol.

A class of bar code symbologies known as two dimensional (2D) matrix symbologies have been developed which require image based reading and offer greater data densities and capacities than 1D symbologies. 2D matrix codes encode data as dark or light data elements within a regular polygonal matrix, accompanied by graphical finder, orientation and reference structures.

Often times an optical reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or optical transceiver for communicating with a remote computer.

Some data collection devices, such as hand-held indicia readers, are capable of capturing images as well as reading barcodes. The reading and decoding of a barcode represents an operation distinct from that involved in capturing an image. The reading and decoding of a bar code involves the imaging and then decoding of a one or two dimensional graphic symbol into the alphanumeric, full ASCII or other data sequence encoded by the symbol. The capturing of an image involves storing an electronic visual copy/representation of the image.

A platform that may be utilized to house and indicia reader is a mobile device. Mobile devices (also referred to as smart phones, handheld devices, handheld computers, PDAs, PDTs, etc.) are widely used worldwide, and may be described as pocket-sized computing devices, typically having a display screen with touch input or a miniature keypad. In some mobile devices the input and output are combined into a touch-screen interface. Mobile devices are popular because they provide the assistance and convenience of a conventional computer (laptop, notebook or otherwise) in environments where carrying one would not be practical. Enterprise digital assistants further extend the available functionality of mobile devices.

An Enterprise digital assistant (EDA) is a handheld computer adapted for usage with SME (Small to Medium Enterprise) and Enterprise business Application software|Applications as a data capture mobile device. Such data capture applications include indicia readers, biometrics, magnetic stripe, smart card and RFID data capture technologies used within communication networks such as WLANs (Wireless Local Area Networks), Bluetooth, Wide area network|WAN/LAN/Personal Area Network|PAN voice and data communications, VOIP and GPRS Edge Communications.

Efforts regarding such systems have led to continuing developments to improve their versatility, practicality and efficiency.

DETAILED DESCRIPTION

Reference will now be made to exemplary embodiments which are illustrated in the accompanying drawings. Other embodiments may be in various forms and the exemplary embodiments should not be construed as limited to the embodiments set forth herein. Rather, these representative embodiments are described in detail so that this disclosure will be thorough and complete, and will fully convey the scope, structure, operation, functionality, and potential applicability to those skilled in the art. Wherever possible, the same reference numbers will be used throughout the drawings to refer to the same or like parts. The term "scan" or "scanning" used herein refers to reading or extracting data from an information bearing indicia (or symbol). The term imaging used herein refers to the taking or creation of an electronic image.

Figure 1:
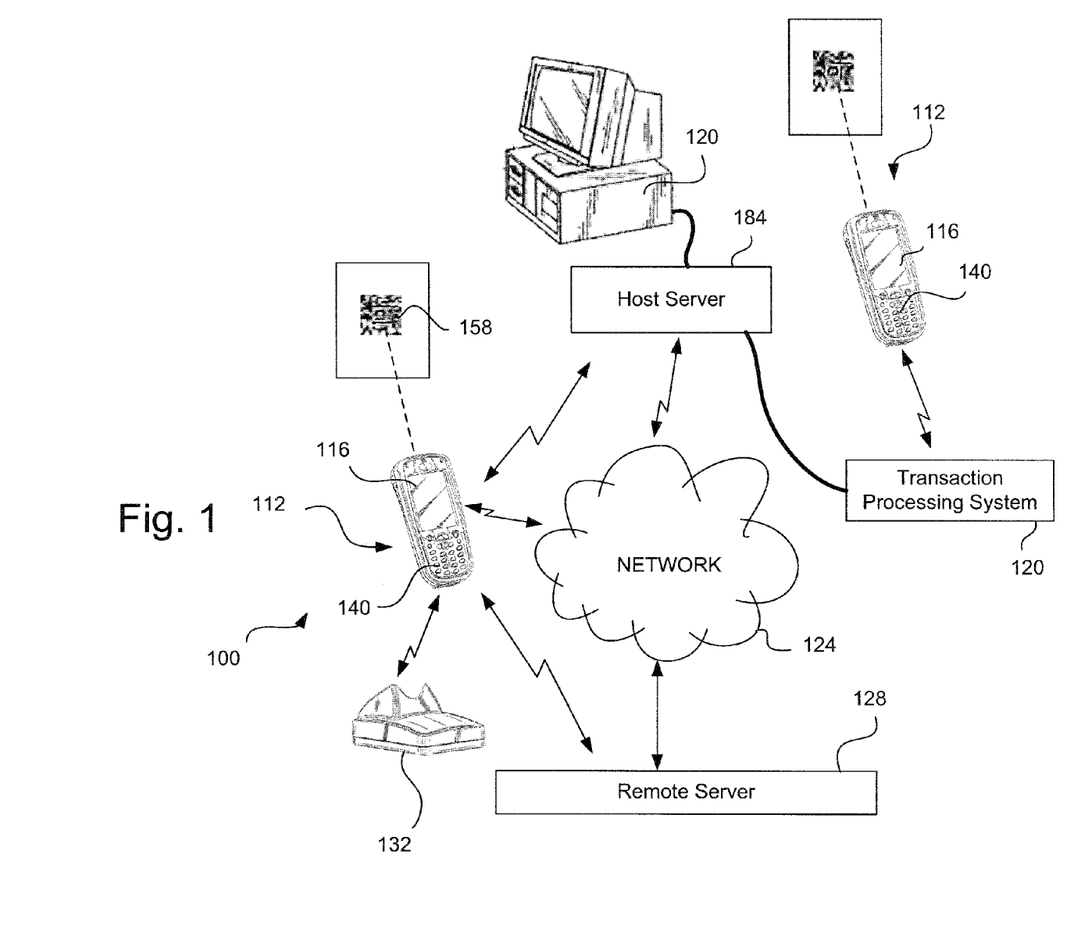
FIG. 1 is a block diagram of an exemplary mobile device system.

FIG. 1 illustrates an exemplary mobile device system 100 configuration, wherein a plurality of mobile devices 112 are being operated or utilized which may be in communication (wired or wireless) with other mobile devices 112, a local host/sever 184, point of transaction processing system 120, a network 124, a remote/web server 128, a base unit 132 or other systems and devices having communication capabilities. The mobile device system 100 may be in communication directly with each other or indirectly through other devices, networks, servers or systems.

The mobile devices 112 may be configured as indicia readers operated according to an embodiment of the present invention and utilized where information bearing indicia (IBI) are present. The indicia readers may be stationary or hand-held and may be either laser indicia reading devices (or laser scanners) utilizing transmitted laser light or optical indicia reading devices utilizing image capturing. The mobile devices have indicia reading assemblies for extracting data from IBIs.

Exemplary mobile device indicia readers 112 may be a hand held scanner, a portable data terminal (PDT), personal digital assistant (PDA), mobile phone, etc. A Portable Data Terminal, or PDT, is typically an electronic device that is used to enter or retrieve data via wireless transmission (WLAN or WWAN) and may also serve as an indicia reader used in stores, warehouse, hospital, or in the field to access a database from a remote location. Personal Digital Assistants (PDAs) are handheld devices typically used as a personal organizer, and may have many uses such as calculating, use as a clock and calendar, playing computer games, accessing the Internet, sending and receiving E-mails, use as a radio or stereo, video recording, recording notes, use as an address book, and use as a spreadsheet.

The mobile devices may be operated or utilized in a remote location, such as in an establishment, a store point of transaction (POT), a warehouse, a delivery truck, in the field, etc. Distances for communications from the mobile device may be short (a few meters as in television remote control) or very long (thousands or even millions of kilometers for radio communications). Wireless communication may involve radio frequency communication and may involve point-to-point communication, point-to-multipoint communication, broadcasting, cellular networks and other wireless networks. This may involve: cordless telephony such as DECT (Digital Enhanced Cordless Telecommunications); Cellular systems such as 0G, 1G, 2G, 3G or 4G; Short-range point-to-point communication such as IrDA or RFID (Radio Frequency Identification), Wireless USB, DSRC (Dedicated Short Range Communications); Wireless sensor networks such as ZigBee; Personal area networks such as Bluetooth or Ultra-wideband (UWB from WiMedia Alliance); Wireless computer networks such as Wireless Local Area Networks (WLAN), IEEE 802.11 branded as WiFi or HIPERLAN; or Wireless Metropolitan Area Networks (WMAN) and Broadband Fixed Access (BWA) such as LMDS, WiMAX or HIPERMAN.

Mobile devices may be utilized as part of Mobile Enterprise (Mobile ERP), which is a collection of Online Interactive Business Applications such as SMS and E-mail. Business modules, functions and operations executed using Mobile Enterprise include Collaboration, Document management system (DMS), Customer relationship management (CRM), Point of sale (POS), Human resource management systems (HRMS), Accounting software, Enterprise resource planning (ERP), including sales order, sourcing, tender, request for Quotation, purchase order, shipment, receiving, warehousing, inventory control, delivery order, invoicing, customer service order, production monitoring and control, work order, as well as basic utilities such as corporate calendar, corporate address book, corporate bulletin board, notes and internal messaging.

Mobile Enterprise (Mobile ERP) devices require manual data entry for various applications. The manual data entry can be labor intensive and requires the user to be very precise when entering the data.

Figure 2:
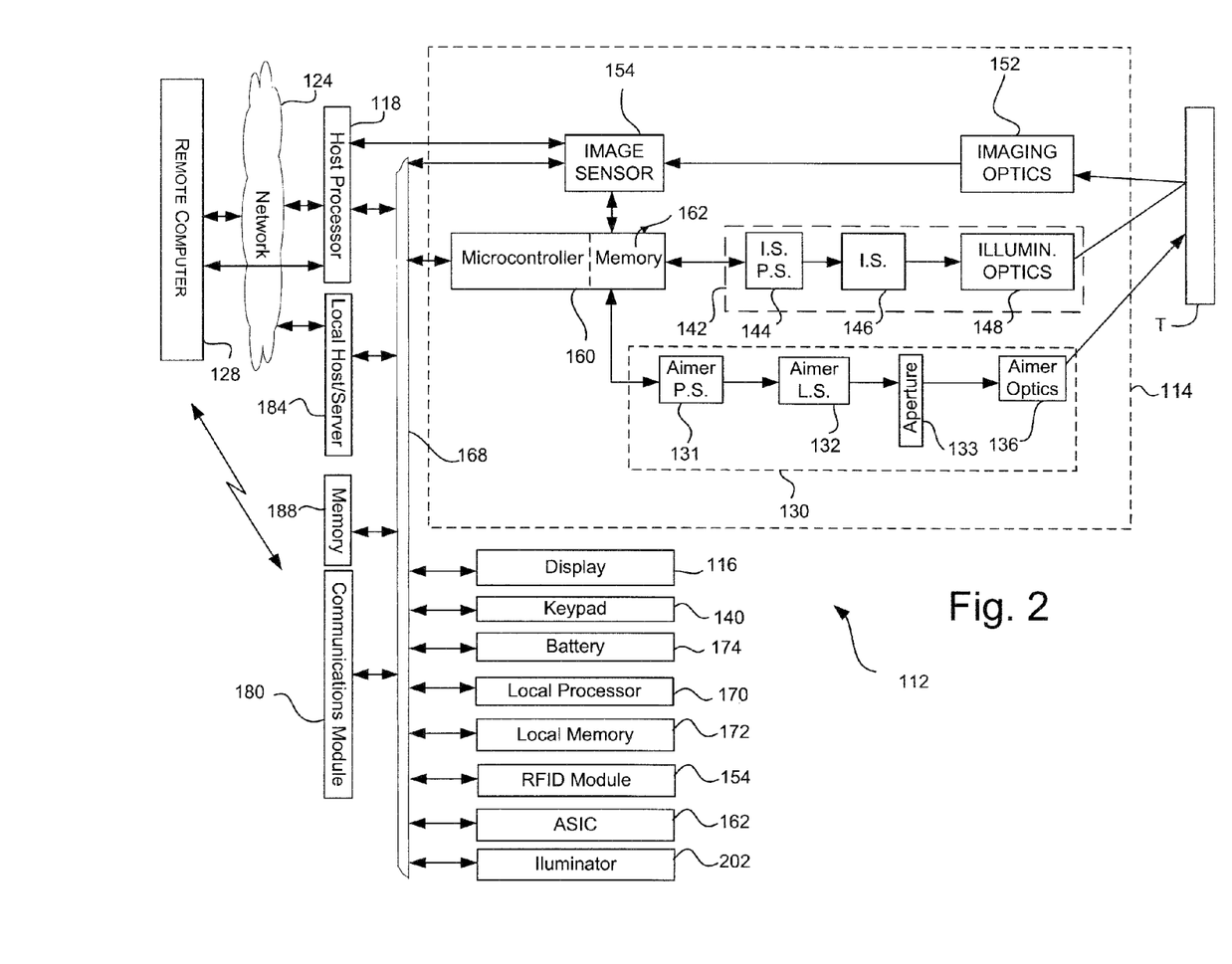
FIG. 2 is a block schematic diagram of an exemplary mobile device.

Referring to FIG. 2, a mobile device 112 may have a plurality of exemplary subsystems or components supported by a housing configured for hand held operation, the mobile device including an indicia reading assembly 114, a RFID module 154, an illuminator 202, local processor 170, an ASIC 162, local memory 172, a battery 174, a display 116, a key pad 140, a communications module 180 which may communicate via one or more bus 168, data lines or other signal or data communication form. The mobile device may communicate with a host processor 118, a local host/server 184, host memory 188, network 124 or remote server 128. Communications module 180 provides a communication link from imaging reader 114 to other imaging readers or to other systems such as a server/remote processor 124.

An exemplary indicia reading assembly 114 may have a number of subsystems for capturing and reading images, some of which may have symbol indicia provided therein. Indicia reader assembly 114 may have imaging receive optics 152 for receiving light reflected from a target T and directing or projecting the reflected light from the target T to an image sensor 154.

The receive optics 152 has a focal point wherein parallel rays of light coming from infinity converge at the focal point. If the focal point is coincident with the image sensor, the target (at infinity) is "in focus". A target T is said to be in focus if light from target points are converged about as well as desirable at the image sensor. Conversely, it is out of focus if light is not well converged. "Focusing" is the procedure of adjusting the distance between the receive optics and the image sensor to cause the target T to be approximately in focus. The target may be any object or substrate and may be an information bearing indicia, text or other machine readable indicia.

Image sensor 154 may be a one or two-dimensional array of pixels adapted or configured to operate in a rolling shutter, global shutter or full frame operating mode which is a color or monochrome 2D CCD, CMOS, NMOS, PMOS, CID, CMD, etc. solid state image sensor. This sensor contains an array of light sensitive photodiodes (or pixels) that convert incident light energy into electric charge. Solid state image sensors allow regions of a full frame of image data to be addressed.

In a full frame (or global) shutter operating mode, the entire imager is reset before integration to remove any residual signal in the photodiodes. The photodiodes (pixels) then accumulate charge for some period of time (exposure period), with the light collection starting and ending at about the same time for all pixels. At the end of the integration period (time during which light is collected), all charges are simultaneously transferred to light shielded areas of the sensor. The light shield prevents further accumulation of charge during the readout process. The signals are then shifted out of the light shielded areas of the sensor and read out.

An exemplary sensor 154 may be a back-illuminated sensor. In a back-illuminated back-illuminated image sensor an incident light beam is irradiated to the back face of a chip opposite to the other face or surface of the chip on which electrodes and the like are disposed. The back-illuminated back-illuminated image sensor is provided with a light converting portion for each pixel on the back face side of the chip, and it is provided with portions for processing signal charges (charge processing portions) in some way, such as an ND converter and a signal storage portion on the surface side of the chip. If visible light is the incident beam, the pixels are photoelectric cells or photodiodes.

The output of the image sensor may be processed utilizing one or more functions or algorithms to condition the signal appropriately for use in further processing downstream, including being digitized to provide a digitized image of target T. Digitizing or digitization may be representing an object, an image, or a signal (usually an analog signal) by a discrete set of its points or samples. The result is called "digital representation" or, more specifically, a "digital image", for the object, and "digital form", for the signal. Digitization may be performed by reading an analog signal A, and, at regular time intervals (sampling frequency), representing the value of A at that point by an integer. Each such reading is called a sample.

A microcontroller 160 may perform a number of processing functions and be located on board with other components, such as the image sensor. The particulars of the functionality of microcontroller 160 may be determined by or based upon certain configuration settings or data which may be stored in firmware, remote 166 or local memory 162, 172. Exemplary functions of microcontroller 160 may be controlling the amount of illumination provided by an illumination source 146 by controlling the output power provided by illumination source power supply 144 and controlling an aiming pattern generator 130. Microcontroller 160 may also control other functions and devices.

An exemplary microcontroller 160 is a mixed-signal array with on-chip controller devices designed to replace multiple traditional MCU-based system components with one single-chip programmable device. It may include configurable blocks of analog and digital logic, as well as programmable interconnects.

Microcontroller 160 may include a predetermined amount of memory 162 for storing firmware and data. The firmware may be a software program or set of instructions embedded in or programmed on the microcontroller which provides the necessary instructions for how the microcontroller operates and communicates with other hardware. The firmware may be stored in the flash memory (ROM) of the microcontroller as a binary image file and may be erased and rewritten. The firmware may be considered "semi-permanent" since it remains the same unless it is updated. This firmware update or load may be handled by a device driver.

The components in reader 114 may be connected by one or more bus 168, data lines or other signal or data communication form. Exemplary forms may be an Inter-IC bus such as a two wire interface (TWI), dedicated data bus, RS232 interface, USB, etc.

A TWI bus is a control bus that provides a communications link between integrated circuits in a system. This bus may connect to a host computer in relatively close proximity, on or off the same printed circuit board as used by the imaging device. TWI is a two-wire serial bus with a software-defined protocol and may be used to link such diverse components as the image sensor 154, temperature sensors, voltage level translators, EEPROMs, general-purpose I/O, ND and D/A converters, CODECs, and microprocessors/microcontrollers.

A host processor 118 or a local processor 170 may be utilized to perform a number of functional operations, which may involve the performance of a number of related steps, the particulars of which may be determined by or based upon certain configuration settings stored in firmware or memory 166 which may be any one of a number of memory types such as RAM, ROM, EEPROM, etc. In addition some memory functions may be stored in memory 162 provided as part of the microcontroller 160.

An exemplary function of a processor 118, 170 may be to decode machine readable symbology provided within the target or captured image. One dimensional symbologies may include very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. 2D symbologies may include Aztec, Datamatrix, Maxicode, QR-code, or other 2D symbologies. UPC/EAN bar codes are used as the standard to mark retail products throughout North America, Europe and several other countries throughout the worlds. Decoding is a term used to describe the interpretation of a machine readable code contained in an image projected on the image sensor 154. The code has data or information encoded therein. Information respecting various reference decode algorithm is available from various published standards, such as by the International Standards Organization ("ISO").

Aiming pattern generator 130 may include a power supply 131, light source 132, aperture 133 and optics 136 to create an aiming light pattern projected on or near the target which spans a portion of the receive optical system 152 operational field of view with the intent of assisting the operator to properly aim the scanner at the bar code pattern that is to be read. A number of representative generated aiming patterns are possible and not limited to any particular pattern or type of pattern, such as any combination of rectilinear, linear, circular, elliptical, etc. figures, whether continuous or discontinuous, i.e., defined by sets of discrete dots, dashes and the like.

Generally, the aiming light source may comprise any light source which is sufficiently small or concise and bright to provide a desired illumination pattern at the target. For example, light source 132 for aiming generator 130 may comprise one or more LEDs.

The light beam from the LEDs 132 may be directed towards an aperture 133 located in close proximity to the LEDs. An image of this back illuminated aperture 133 may then be projected out towards the target location with a lens 136. Lens 136 may be a spherically symmetric lens, an aspheric lens, a cylindrical lens or an anamorphic lens with two different radii of curvature on their orthogonal lens axis. Alternately, the aimer pattern generator may be a laser pattern generator.

The light sources 132 may also be comprised of one or more laser diodes. In this case a laser collimation lens (not shown in these drawings) will focus the laser light to a spot generally forward of the scanning hear and approximately at the plane of the target T. This beam may then be imaged through a diffractive interference pattern generating element, such as a holographic element fabricated with the desired pattern in mind.

Indicia reader may include an illumination assembly 142 for illuminating target area T. Illumination assembly 142 may also include one or more power supplies 144, illumination sources 146 and illumination optics 148.

Illumination and aiming light sources with different colors may be employed. For example, in one such embodiment the indicia reader may include white and red LEDs, red and green LEDs, white, red, and green LEDs, or some other combination chosen in response to, for example, the color of the symbols most commonly imaged by the indicia reader. Different colored LEDs may be each alternatively pulsed at a level in accordance with an overall power budget.

In an exemplary embodiment the illumination source may be a laser for reflecting laser light off the target. This may be referred to laser scanning wherein the reflected laser light is converted into signals reflected off an IBI into IBI signals representative of the IBI. An aiming pattern generator may not be necessary in such an embodiment if the illumination laser provides an aiming function in addition to an illumination function.

It is to be noted that the image sensor 154 may read images with illumination from a source other than illumination source 146, such as by illumination from a source located remote from the reader.

The processor, memory and associated circuitry which performs or controls the exemplary image capture and decoding functions may be provided in the indicia reader assembly 114 or on associated circuit boards which are supported by the housing of the mobile device 112.

Exemplary functions of a processor or processors 118, 170 may be to facilitate operation of the image capture function, decoding functions, and operator interface functions. Operating software may be utilized to operate the processor for such functions seemingly simultaneously or in a multitasking role. An exemplary image reader operating software architecture may be organized into processes or threads of execution. Operation of the decoding, which may be executed in a user or factory selectable relationship to a scanning routine, may be governed by parameters or configuration settings which are enabled for processing as a part of an autodiscrimination process, whether decoding is to be continuous or discontinuous, etc. Permitted combinations of scanning and decoding parameters together define the scanning-decoding relationships or modes which the reader will use. In the continuous mode (also referred to as continuous scanning mode, continuous streaming mode, streaming mode, fly-by scanning mode, on the fly scanning mode or presentation mode) the reader is held in a stationary manner and targets (such as symbols located on packages) are passed by the reader 112. In the continuous mode, the reader takes continuous image exposures seriatim and continuously decodes or attempts to decode some or all of these images. In the continuous mode exposure times and decoding times may be limited.

Figure 5:
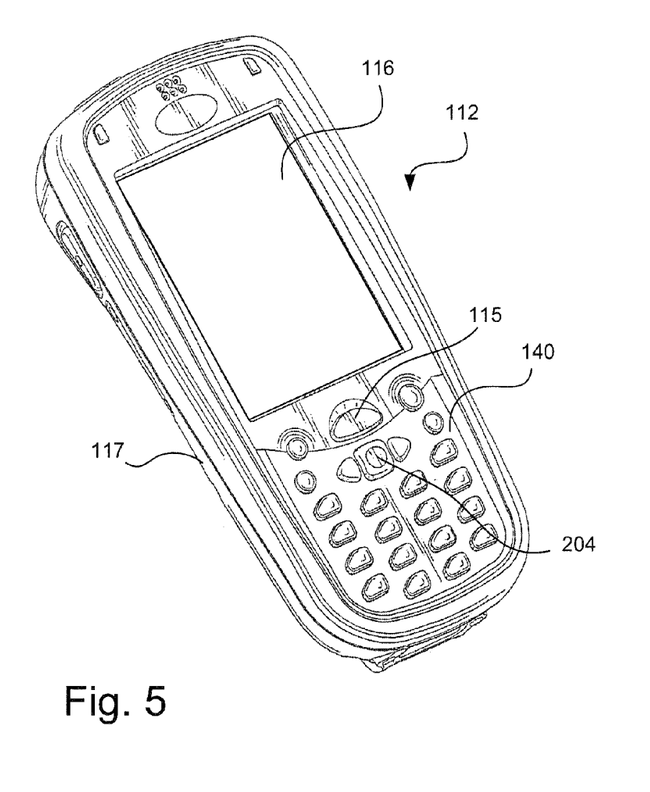
FIG. 5 is a side view of an exemplary mobile device.
Figure 6:
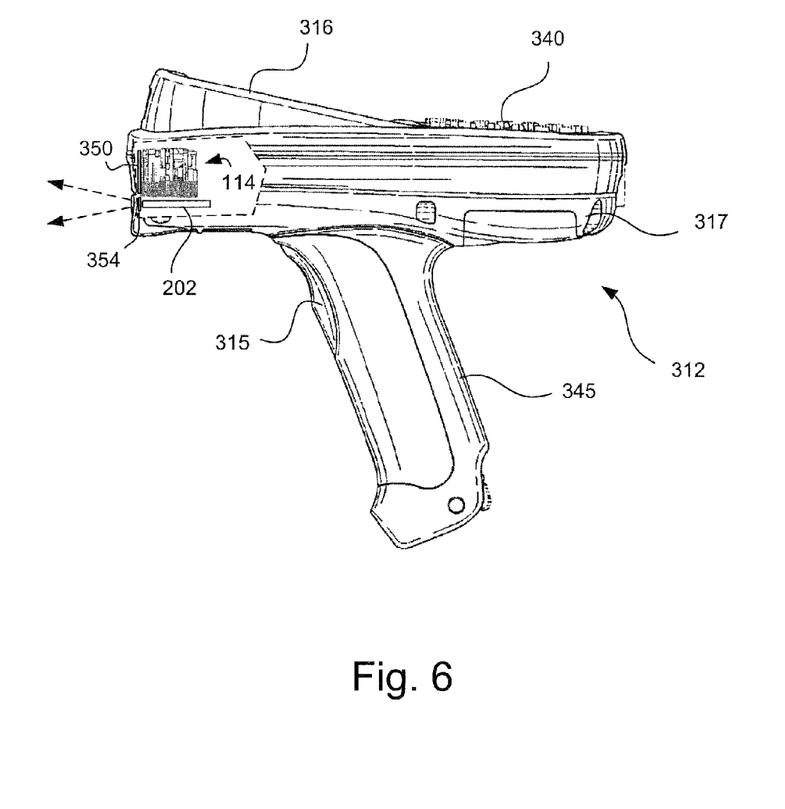
FIG. 6 is a fragmentary partially cutaway side view of an exemplary indicia reader.

Discontinuous mode is a mode wherein scanning and/or decoding stops or is interrupted and initiated with an actuation event, such as pulling or pushing of a trigger or button, (115, 315) to restart. An exemplary utilization of the reader in discontinuous mode is via hand held operation. While triggered, the image reader may expose images continuously and decode images continuously. Decoding stops once the image reader is no longer triggered. Exposing of images however, may continue. In the discontinuous mode, the exposure time, decoding time out limits and decoding aggressiveness may be increased more than those set for continuous mode by utilizing a different decoding algorithm. The discontinuous mode is typically initiated because the operator knows a symbol is present. The decoder therefore may forego making a determination of the presence of a symbol because a symbol is presumed to be in the field of view. Discontinuous mode may provide longer range scanning than the continuous mode.

Switching between continuous and discontinuous modes may be accomplished by use of a trigger located on the reader. For example, when the trigger is depressed by an operator the reader may operate in a discontinuous mode and when the trigger is released the reader may switch to continuous mode after a predetermined period of time. A scanning subroutine may specify an address buffer space or spaces in which scan data is stored and whether scanning is to be continuous or discontinuous. Another example of switching between continuous and discontinuous modes may be accomplished by symbology wherein switching between the modes depends on the type of symbology detected. The reader may stop attempting to decode a symbol after a predetermined time limit. The reader may limit the type of symbols to decode when in the continuous mode.

The aiming pattern generator 130 may be programmed to operate in either continuous or discontinuous modes.

In the continuous mode, an exemplary mobile device may be configured to automatically switch to a reduced power state if no symbol has been sensed for a period of time. Upon sensing of a symbol the scanner may then automatically switch back to the higher power state continuous mode. In this reduced power state the scanner may change from having the aimer and/or illumination light sources on for every scan to having either/or on for only some of the scans (e.g. every 2 or 3 or less scans). In this manner the system may still be in a position to sense the presence of a symbol, but will draw less current and also generate less internal heating. After sensing a symbol, the image reader may utilize aiming/illumination for every scan until another period of inactivity is sensed. Mode changes may be accomplished by the host computer in response to an appropriate signal over either a direct connection or wireless connection to the scanner.

Exemplary indicia readers may use the aforementioned memory or firmware flash memory to store certain reader settings or reader configuration settings. Exemplary configuration settings may be pre-defined bar code output data based on the scan input.

Other exemplary configuration settings may be settings that affect the functional operation of the host processor or microcontroller, such as a scanning subroutine which specifies the address buffer space or spaces in which scan data will be stored and whether scanning is to be continuous (e.g., at a full video rate, such as 30 frames per second), or discontinuous (e.g., with pauses related to the current state of the trigger). The operation of the decoding routine, which is executed in a user or factory selectable relationship to the scanning routine, is governed by configuration settings which control the codes which are enabled for processing as a part of an autodiscrimination process, whether decoding is to be continuous or discontinuous, etc. Exemplary combinations of scanning and decoding configuration settings together define the scanning-decoding relationships or modes which the reader will use.

Other exemplary configuration settings may be aiming pattern center coordinates or position in order to decode the symbol that is closest to the aiming center parameter, or the symbol that is in some position relative to the aiming center.

Other exemplary configuration settings may be optical reader configuration, aimer configuration, number of pixels in the image to be used for initializing buffers, engine orientation, field illumination which may be defined as a profile saved as a function of radius from the imager optical centerline, information regarding lens distortions across the active image field, image distortion, dead or bad pixel, or image sensor noise corrections within the image processing algorithm.

Other exemplary configuration settings may be max LED current, receiving lens prescription or parameters functionally related thereto, laser diode aiming system power output or operating current or a parameter related thereto.

Other exemplary configuration settings may be indicia reader capabilities, such as whether the imager is enabled for image capture, what type of decoder level is enabled, or what types of symbology decoding is enabled.

Other examples of configuration settings are aiming pattern operation; field illumination; lens distortion; optical reader orientation; optical reader configuration; aimer configuration; software control, sales tracking or warranty tracking, indicia reader capabilities, such as whether the imager is enabled for image capture, what type of decoder level is enabled, or what types of symbology decoding is enabled, different methods of mobile device control, or different methods of decoding, or different methods of displaying and saving images, etc.

Some of the configuration settings may be non-default configuration settings. A non-default configuration setting is a configuration setting that is not part of standard software/firmware provided by a reader manufacturer. Non-default configuration settings may be unique to a particular reader, a particular image engine, a particular establishment having multiple readers, a particular enterprise having multiple establishments having one or more readers, etc.

Figure 3:
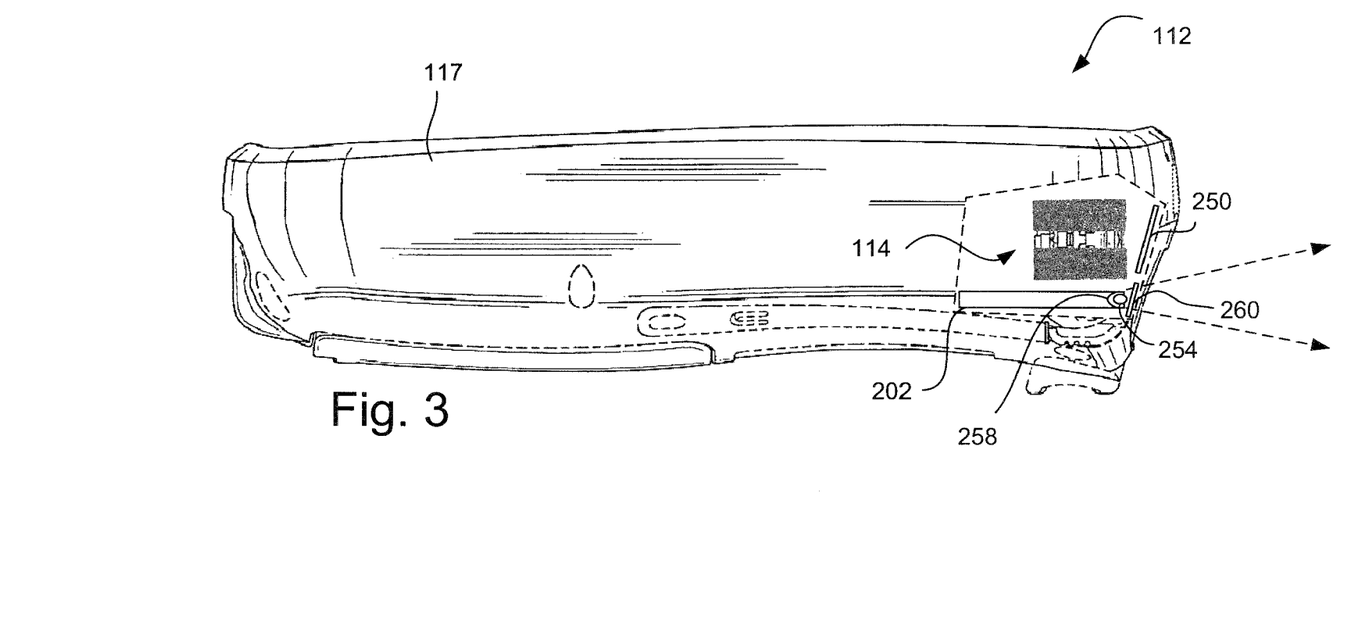
FIG. 3 is a fragmentary partially cutaway side view of an exemplary indicia reader.
Figure 4:
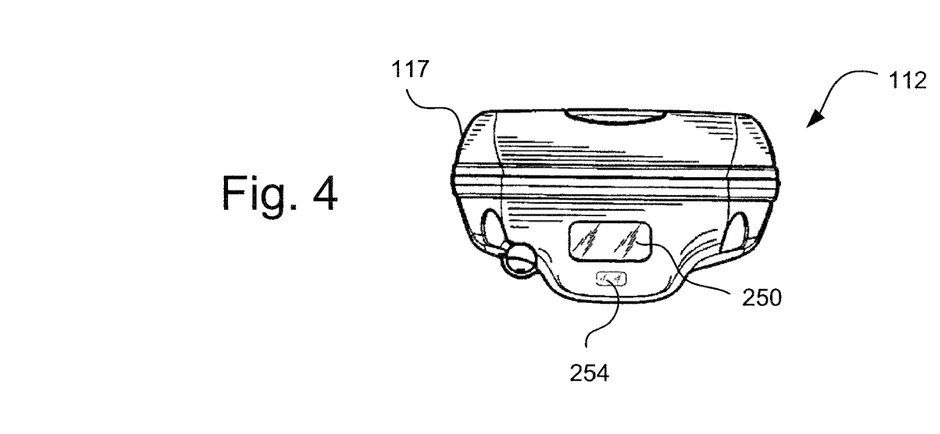
FIG. 4 is a perspective view of an exemplary mobile device.

FIGS. 3 and 4 illustrate an exemplary mobile device 112 having an indicia reader assembly 114, a display 116, keypad 140, and an illuminator 202 contained within a housing 117 designed, contoured or adapted for hand held operation. The indicia reader transmits and/or receives light through a transparent window 250. What is meant by hand held operation is that the mobile device can be easily grasped and held by a user. The mobile device is a light-weight, truly portable device with a housing that is shaped so as to fit comfortably into a human hand and can be easily held and carried about without tiring the user. A button 115 may be utilized to control functions of the mobile device, such as indicia reading.

The illuminator 202 may be a relatively bright light source used by the operator to provide illumination to see under dark or low ambient lighting conditions as a flashlight would be used. It may be actuated or activated by a button 204, key, switch or other device engaged by the operator. The illuminator may operate separately from the use of the indicia reader.

The illuminator is an electric-powered light source integrated into the mobile device. The illuminator may be comprised of an incandescent lightbulb 254, lightemitting diode (LED) or incandescent/LED hybrid illumination device. A reflector 258 and/or diffuser 260 may be used reflect and diffuse emitted light.

In an exemplary embodiment, the illumination generated by the illuminator is about or on the order of greater than 0.8 w/m$^2$ with a 12 inch diameter aperture on axis at about 5 feet from the front of the image reader with an exemplary range being about or on the order of between 0.8 w/m$^2$ and 2 w/m$^2$ or more with a 12 inch diameter aperture on axis at about 5 feet from the front of the image reader.

In an exemplary embodiment the mobile device may be configured to disable scanning or reading of indicia when the illuminator is activated or turned on.

In another exemplary embodiment the mobile device may be configured so that the illuminator is used to add illumination to a target when reading in addition to the illumination provided by the indicia reader illumination source 146.

In another exemplary embodiment, one or more indicia reader operating setting or conditions or indicia reader configuration settings may be changed when the illuminator is activated. For example, image capture exposure time may be changed when the illuminator is activated.

FIG. 5 illustrates an exemplary hand held mobile device 312 having a keypad 340 and display or touch screen 316, an indicia reader assembly 114 and an illuminator 202 supported by a housing 317, having protective transparent windows 350, 354 provided therein. A handle 345 extending vertically below the housing may be included as either attached to or a part and parcel with the mobile device. The handle may make it easier for a user to hold the device while operating the keypad. The mobile device may have an indicia reader. If so, the handle 345 may be easily grasped and held by a user so that the mobile device can be rapidly trained upon an IBI situated some distance from the user. The mobile device preferably is a light-weight, truly portable device that can be easily held and carried about without tiring the user. A button 315 may be utilized to control functions of the mobile device, such as indicia reading.

Figure 7:
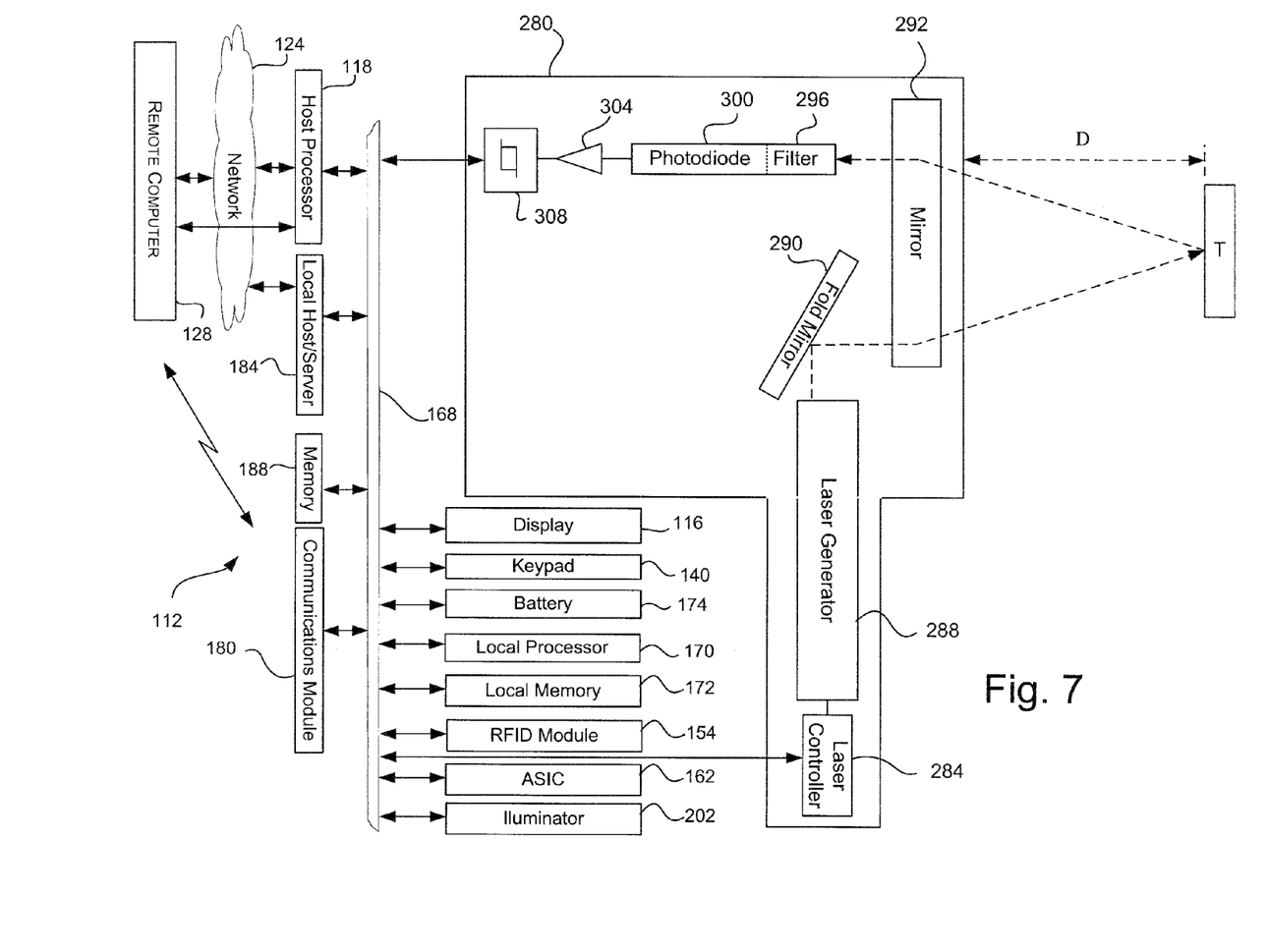
FIG. 7 is a block diagram of an exemplary mobile device system.

Referring to FIG. 7, an exemplary indicia reader 112 may comprise a number of exemplary subsystems, such as a laser scan engine 280 or laser scanning reader system for reading indicia on a target T. The laser scanning reader system may comprise a near laser controller 284 for controlling a near laser generator 288 for generating a near laser scanning pattern which is directed by folding mirror 290 and an oscillating or rotating mirror 292 onto a target T. The laser scanning pattern is reflected off of the target and redirected by mirror 292 into a receive path comprising a laser light pass filter 296, a photodiode 300, an amplifier 304 and a digitizer 308.

Digitizer 308 may convert an analog signal output by the photodiode into a digital signal representative of the light reflected off of the targets.

Exemplary laser scanners use a laser beam as the light source and employ either a reciprocating mirror or a rotating prism to scan the laser beam back and forth across the IBI. One or more photodiodes are used to measure the intensity of the light reflected back from the bar code. The light emitted by the reader is rapidly varied in brightness with a data pattern and the photodiode receive circuit is designed to detect only signals with the same modulated pattern.

An exemplary photodetector or photosensor may be comprised of one or more photodiodes that converts incident light energy into electric charge that is an output signal representative of light reflected off an IBI. The output of the photodetector may be processed utilizing one or more functions or algorithms to condition the signal appropriately for use in further processing downstream.

Laser light may be described as a spatially coherent, narrow low-divergence beam of light. The output signal of the photodetector may be processed utilizing one or more functions or algorithms to condition the signal appropriately for use in further processing downstream, including decoding of IBIs. Laser scanning reader system 280 may be configured for scanning an IBI at a distance D from the reader.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The described embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

The invention claimed is:

1. A mobile device, comprising:
   an indicia reader for reading information bearing indicia;
   a reading illumination system for illuminating the information bearing indicia when reading the information bearing indicia;
   a communication module for sending and receiving radio communications;
   a display for displaying information;
   a processor for controlling software and firmware operation;
   a keypad for entering data to the processor;
   an illuminator for providing an operator with illumination under low ambient lighting conditions for use as a flashlight operating separately from the use of the indicia reader; and,
   a housing supporting the communication system, display, image processor, illuminator and keypad configured to facilitate an operator holding the mobile device in one hand and keypad data entry with the other hand,
   wherein the illuminator provides illumination about greater than 0.8 W/m$^2$ and 2 W/m$^2$ with a 12 inch diameter aperture on axis at about 5 feet from the front of the mobile device.

2. A mobile device in accordance with claim 1, wherein the indicia reader comprises:
   an image sensor array of pixels for converting light reflected from a target containing a machine readable indicia into output signals representative thereof;
   receive optics for directing light from the target to the image sensor array, the optics having a receive optics optical axis; and,
   an aiming pattern generator for providing an aiming pattern on the target;
   wherein the processor decodes the output signals.

3. A mobile device in accordance with claim 1, wherein the indicia reader comprises a laser scan engine.

4. A mobile device in accordance with claim 1, wherein the illuminator may be operated separately from use of the indicia reader.

5. A mobile device in accordance with claim 1, wherein the illuminator comprises at least one of the following: an incandescent illumination source; a LED illumination source; and a hybrid incandescent/LED illumination source.

6. A mobile device, comprising:
   an indicia reader for reading information bearing indicia;
   a reading illumination system for illuminating the information bearing indicia when reading the information bearing indicia;
   a communication module for sending and receiving radio communications;
   a display for displaying information;
   a processor for controlling software and firmware operation;
   a keypad for entering data to the processor;
   an illuminator for providing an operator with illumination under low ambient lighting conditions for use as a flashlight operating separately from the use of the indicia reader; and,
   a housing supporting the communication system, display, image processor, illuminator and keypad configured to facilitate an operator holding the mobile device in one hand and keypad data entry with the other hand,
   wherein the illuminator provides illumination about between 0.8 W/m$^2$ and 2 W/m$^2$ or more with a 12 inch diameter aperture on axis at about 5 feet from the front of the mobile device.

7. A mobile device in accordance with claim 6, wherein the indicia reader is disabled when the illuminator is activated or turned on.

8. A mobile device in accordance with claim 6, wherein one or more indicia reader operating settings is changed when the illuminator is activated.

9. A mobile device in accordance with claim 6, wherein the indicia reader has an image capture exposure time and the image capture exposure time is changed when the illuminator is activated.

10. A method of operating a mobile device comprising the steps of:
    reading information bearing indicia with an indicia reader;
    illuminating the information bearing indicia when reading the information bearing indicia with a reading illumination system;
    sending and receiving radio communications with a communication module;
    displaying information on a display;
    controlling software and firmware operation with a processor;
    entering data to the processor with a keypad;
    illuminating an environment under low ambient lighting conditions with an illuminator for use as a flashlight operating separately from the use of the indicia reader; and,
    supporting the communication system, display, image processor, illuminator and keypad in a housing configured to facilitate an operator holding the mobile device in one hand for the reading and illuminating and keypad data entry with the other hand,
    wherein the illuminator provides illumination about greater than 0.8 W/m$^2$ with a 12 inch diameter aperture on axis at about 5 feet from the front of the mobile device.

11. A method of operating a mobile device in accordance with claim 10, wherein the reading step comprises capturing an image of a target and decoding information bearing indicia in the captured image.

12. A method of operating a mobile device in accordance with claim 10, wherein the reading step comprises scanning an information bearing indicia with a laser.

13. A method of operating a mobile device in accordance with claim 10, wherein reading is disabled while illuminating with the illuminator.

14. A method of operating a mobile device in accordance with claim 10, wherein the illuminator comprises at least one of the following: an incandescent illumination source; a LED illumination source; and a hybrid incandescent/LED illumination source.

15. A method of operating a mobile device comprising the steps of:
    reading information bearing indicia with an indicia reader;
    illuminating the information bearing indicia when reading the information bearing indicia with a reading illumination system;
    sending and receiving radio communications with a communication module;
    displaying information on a display;
    controlling software and firmware operation with a processor;
    entering data to the processor with a keypad;
    illuminating an environment under low ambient lighting conditions with an illuminator for use as a flashlight operating separately from the use of the indicia reader; and, supporting the communication system, display, image processor, illuminator and keypad in a housing configured to facilitate an operator holding the mobile device in one hand for the reading and illuminating and keypad data entry with the other hand, wherein the illuminator provides illumination about between 0.8 W/m$^2$ and 2 W/m$^2$ or more with a 12 inch diameter aperture on axis at about 5 feet from the front of the mobile device.

16. A method of operating a mobile device in accordance with claim 15, wherein the indicia reader is disabled when the illuminator is activated or turned on.

17. A method of operating a mobile device in accordance with claim 15, wherein one or more indicia reader operating settings is changed when the illuminator is activated.

18. A method of operating a mobile device in accordance with claim 15, wherein the indicia reader has an image capture exposure time and the image capture exposure time is changed when the illuminator is activated.

* * * * *